United States Patent [19]

Kaneko

[11] Patent Number: 5,089,035
[45] Date of Patent: Feb. 18, 1992

[54] DEHUMIDIFIER

[75] Inventor: Toshihiko Kaneko, Tokyo, Japan

[73] Assignee: Esute Chemical Corporation, Tokyo, Japan

[21] Appl. No.: 457,279

[22] Filed: Dec. 27, 1989

[30] Foreign Application Priority Data

Jan. 31, 1989 [JP] Japan ................................. 1-9315

[51] Int. Cl.$^5$ ............................................. B01D 53/14
[52] U.S. Cl. ................................. 55/221; 55/35; 55/385.4; 55/388; 55/472
[58] Field of Search ................ 55/35, 221, 385.4, 388, 55/471, 472, 356

[56] References Cited

U.S. PATENT DOCUMENTS

| 2,420,707 | 5/1947 | Hinger | 55/221 |
| 4,177,045 | 12/1979 | Orel | 55/471 X |
| 4,749,388 | 6/1988 | Francois | 55/221 |

Primary Examiner—Charles Hart
Attorney, Agent, or Firm—McAulay Fisher Nissen Goldberg & Kiel

[57] ABSTRACT

A dehumidifier for removing moisture contained in air upon discharging the air which has been introducing from outside, comprises a container body, a meshed receptacle which is suspended through a receiving mouth formed on top of the container body and accommodates therein a deliquescent moisture absorbent, and a cover which covers the top end of the container body excluding the receiving mouth. On the top end of the container body, there are provided a receiving tube which is suspended therein and the bottom portion of a battery chamber. In the cover, there are provided an air sending tube which forms a vent passage together with the receiving tube being located within the receiving tube and is suspended lower than the receiving tube and a cover which forms the battery chamber together with the bottom portion of the battery chamber of the container body. Further, on the top of the air sending tube, a fan and its driving source are provided. The fan is driven so that the flow of air is introduced either from the receiving tube to the vent passage or vice versa through the container body interior, depending on the rotating direction of the driving source. The air introduced into the container body interior is dehumidified, and the dehumidified air is sent outside. When the level of deliquescence stored within the container body reaches the bottom end of the air sending tube, the vent passage is closed to stop the flow of air.

7 Claims, 4 Drawing Sheets

DEHUMIDIFIER

BACKGROUND OF THE INVENTION

1. Field of the Invention

This invention relates to dehumidifiers utilizing the moisture absorbing property of a deliquescent moisture absorbing composition such as calcium chloride and magnesium chloride. More particularly, it relates to a dehumidifier to be disposed in places such as closets, boot cupboards, and kitchen cabinets for removing the moisture therefrom.

2. Background of the Art

The basic structure of a generally known dehumidifier is such that a deliquescent moisture absorbent is accommodated within an inner receptacle arranged on top of a container body and deliquescence obtained through the reaction in which the absorbent absorbs moisture in the air is stored in a storage chamber located at the bottom of the container body interior by dripping through holes of the bottom of the inner receptacle.

Further, in order to prevent the deliquescence stored at the bottom of the container body interior from flowing out thereof when the container body is thrown over, the opening of the container body is covered with a moisture permeating film.

This moisture permeating film is a special film having the property of passing gaseous molecules such as air and water vapor but not passing liquids such as water and aqueous solution of calcium chloride obtained from the application of the fine porous film structure of, e.g., fluorocarbon resin.

In the ordinary dehumidifier such as above, the opening of the container body is covered with the above mentioned moisture permeating film which is poor in permeability of air, whereby the container body interior cannot be well ventilated, and as a result, the dehumidifying rate is reduced.

On the other hand, electric dehumidifiers (heat pump type) are available on the market. Such dehumidifiers are not only expensive but also are not suitable for being disposed in places such as closets.

SUMMARY OF THE INVENTION

Thus, a first object of this invention is to provide a dehumidifier which is capable of absorbing moisture in the air having a very simple arrangement.

A second object of this invention is to provide a dehumidifier which is capable of preventing deliquescence stored within the container body from flowing out thereof when the container body is thrown over without covering the opening of the container body with a moisture permeating film.

A third object of this invention is to provide a dehumidifier having a moisture absorbing capacity 10 to 15 times as much as that of the ordinary dehumidifier containing a deliquescent moisture absorbent.

A fourth object of this invention is to provide a dehumidifier which is extremely inexpensive and small in size compared to the electric dehumidifiers.

Therefore, this invention provides a dehumidifier comprising a container body, a deliquescent moisture absorbent disposed within the container body, a fan for introducing the air from outside, a driving source capable of reversely rotating for driving the fan, and a cover for covering a part of the top end of the container body. According to the invention, moisture contained in the air is removed upon discharging the air which has been introduced into the container body interior from outside by driving the fan with the driving source.

These and other objects, features and advantages of this invention will become clear from the following description of the preferred embodiment when the same is read in conjunction with the accompanying drawings.

BRIEF DESCRIPTION OF THE DRAWINGS

FIG. 1 is a longitudinal front view thereof;

FIG. 2 is a longitudinal side view thereof;

FIG. 3 is a plan view thereof; and

FIG. 4 is a diagram showing the dehumidifier in an overthrown state.

DESCRIPTION OF THE PREFERRED EMBODIMENT

Figure 1:
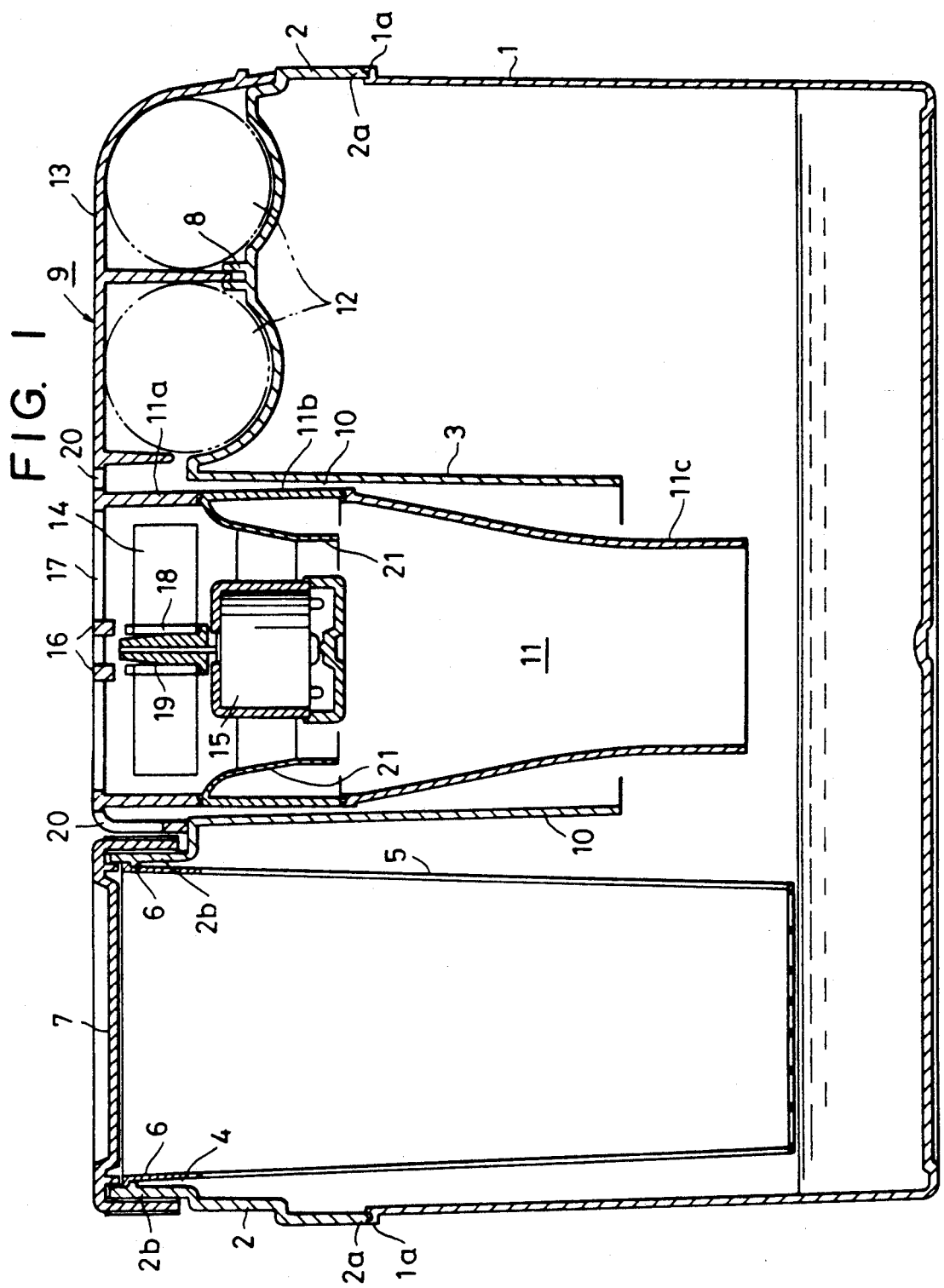
FIGS. 1 through 4 show an embodiment of a dehumidifier according to the invention.
Figure 2:
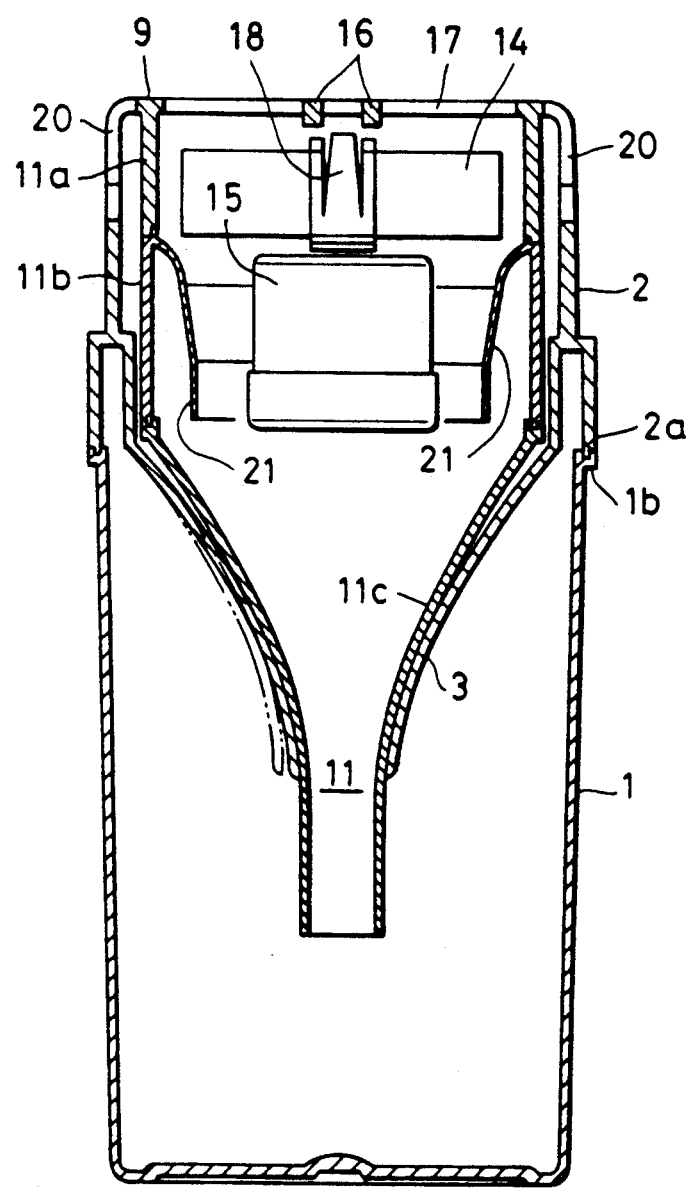
Figure 3:
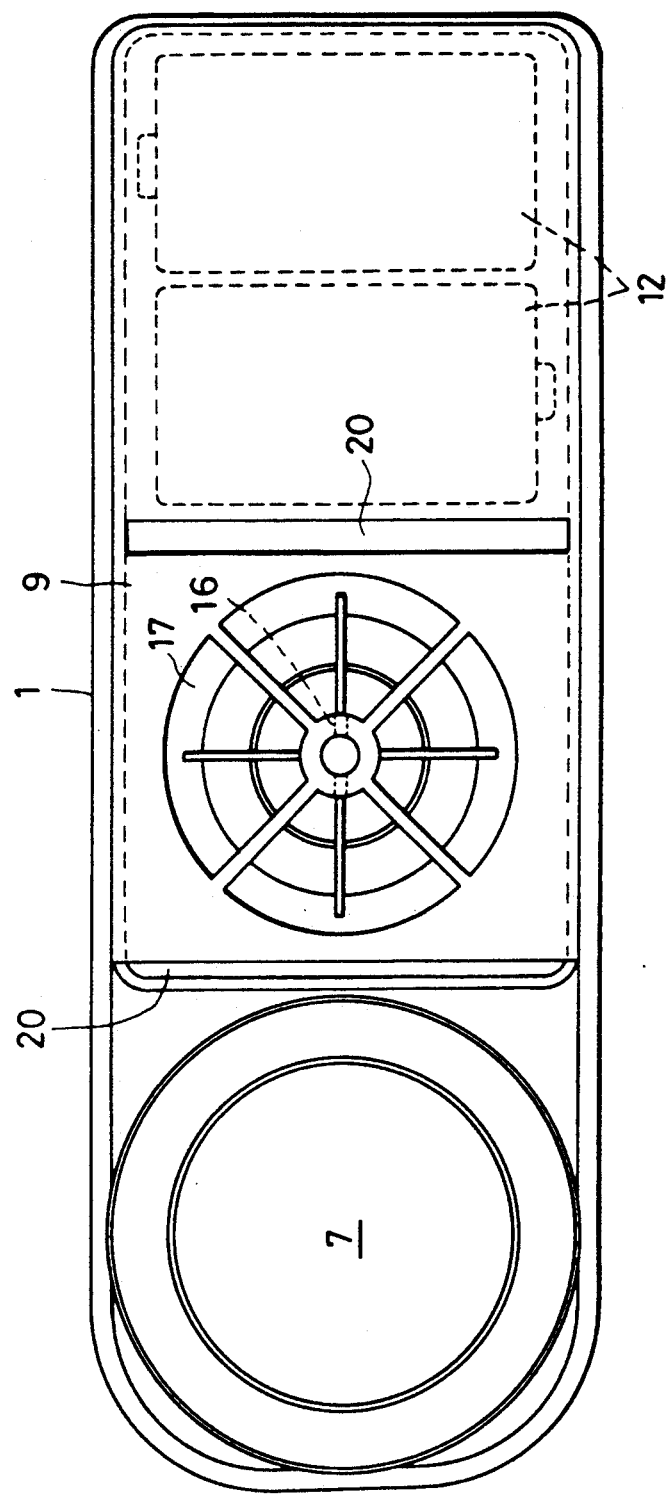

In FIGS. 1 through 3, a box-shaped container body 1 in which an opening is provided on the top end thereof is a molding made of a synthetic resin and has an intermediate cover 2 which is a similar molding made of a synthetic resin and is provided with a receiving tube 3 at the center of the cover. An opening edge portion 1a of the container body 1 and a peripheral portion 2a of the intermediate cover 2 are integrally formed by, e.g., welding.

The intermediate cover 2 which forms part of the container body comprises a receiving mouth 4 on one side with the receiving tube 3 as a boundary. Into the receiving mouth 4, a meshed receptacle 5 for accommodating a deliquescent moisture absorbent such as calcium chloride or magnesium chloride is inserted from top and is suspended by a mouth rim 6 of the receiving tube 3, while a cap 7 is screwed into a mouth portion 2b of the intermediate cover 2 to prevent the meshed receptacle 5 from coming off and to hold it water tight.

Further, on the other side of the container body with the receiving tube 3 as the boundary, there is formed the bottom of a box of batteries which supplies power to an electric fan which will hereinafter be referred to.

A cover 9 is a molding made of a synthetic resin and which fits into the top end of the container body 1 while leaving a portion on which the cap 7 of the intermediate cover 2 is disposed uncovered. The cover 9 is inserted into the receiving tube 3 and, when inserted, forms a chamber for accommodating batteries 12 together with an air sending tube 11, which forms a clearance 10 together with the internal wall of the receiving tube 3 and also the top end of the bottom 8. The cover 9 is also provided with a cover 13 having terminals for being connected to the accommodated batteries 12.

The air sending tube 11 comprises a barrel 11a formed integrally with the bottom surface of the cover 9 for accommodating the fan, a barrel 11b formed as a separate tube for accommodating the fan, and a barrel 11c having a minor diameter at the bottom end opening for emitting the air. These barrels are integrally jointed one to another after the fan 14 and the electric motor 15 have been assembled therein.

More specifically, a projection 16 for preventing the fan 14 from coming off is provided at the center of a vent hole 17 which is disposed on the top side of the barrel 11a so that the top end of a bearing tube 18 is abutted against this locking projection 16. Under this condition, the fan 14 is located at the middle of the barrel 11a.

On the other hand, a barrel member 21 formed as a double tube with the top end thereof being integral is provided within the barrel 11b and the electric motor 15 is assembled to the barrel member 21 so that a vent passage can be formed between the barrel member 21 and the electric motor 15. A truncated, cone-shaped driving shaft 19 mounted along the axis of rotation is then inserted from the bottom end of the bearing tube 18 of the fan 14 to joint connect to the top end of the barrel 11b with the bottom end of the barrel 11a.

Further, the other barrel 11c is joined with the bottom end of the barrel 11b.

Furthermore, a vent hole 20 which communicates with the clearance 10 and functions as a vent passage is provided at a position close to the barrel 11a of the cover 9.

The vent hole 20 and the clearance 10 communicate with an open space which is formed between the internal wall of the receiving tube 3 being suspended within the container body 1 and the external wall of the air sending tube 11. The vent passage is thus formed by these portions.

The bottom end opening of the air sending tube 11, i.e., the position of the bottom end opening of the barrel 11c, is fixed at a predetermined height from the bottom of the container body 1.

The height of the bottom end opening of the receiving tube 3 may be made coincident with that of the bottom end opening of the air sending tube 11.

This height designates a level at which the maximum amount of deliquescence storable between the sidewall of the container body 1 and the receiving tube 3 when the container body 1 falls sideways remains when the container body 1 is returned to the normal position; i.e., a level reached by the deliquescence when a predetermined amount of deliquescence derived from the moisture absorbent has been stored.

The meshed receptacle 5 is located at the receiving mouth 4 of the container body 1 and the top end of the container body 1 is sealed with the cap 7. At the same time, the cover 9 is covered over the container body 1 with the fan 14 being operated by the electric motor 15 which can be driven by merely mounting the batteries 12 to the cover 13, which cover has electrodes.

As a result, the air is introduced to the container body 1 by the operation of the fan 14.

At this time, the fan 14 is rotated by its own weight integrally with the bearing tube 18 which is fitted into the greater diameter base portion of the truncated cone-shaped drive shaft 19 and introduces the air from outside through the vent hole 17 with the rotation in the forward direction of the electric motor 15 to perform a forced suction into the container body 1 using the air sending tube 11 as the air inlet passage.

The introduced air is then discharged by passing through a space between the receiving tube 3 and the air sending tube 11.

Further, by reversely rotating the electric motor 15, i.e., by alternating the poles of the batteries, the air sending tube 11 is caused to function as the outlet passage so that a forced discharge from the container body 1 can be performed.

The discharge of air, in return, causes the air to be introduced from outside through the space between the receiving tube 3 and the air sending tube 11.

As described above, in the interior of the container body 1 in which a forced ventilation is performed by the forward or backward rotation of the electric motor 15, the moisture absorbent accommodated within the meshed receptacle 5 deliquesces by absorbing moisture from the circulating air, and the deliquescence deposits on the bottom of the container body 1 by dripping from the bottom of the meshed receptacle 5.

When the level of deliquescence is gradually increased with further use and thereby further storage and reaches the bottom end opening of the air sending tube 11, the bottom end opening of the air sending tube 11 is closed by the deliquescence, whereby the sending of air driven by the fan stops and thus the forced ventilation stops.

Since there is still slight air sent by the fan 14 under this condition, the deliquescence level is raised slightly above the bottom end opening of the air sending tube 11.

The container body 1 in which the forced ventilation has been put to a stop, is then subjected to natural ventilation by the clearance 10. The capacity of this ventilation is about 1/200 times as small as that of the forced ventilation, so that the container body can be deemed as being in the moisture absorption stop condition. As a result, the amount of deliquescence stored up to the level of deliquescence is the maximum volume.

Figure 4:
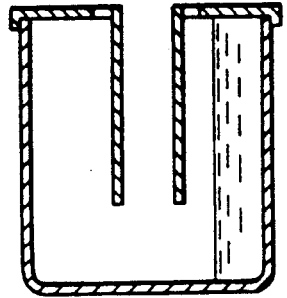
Figure 4:
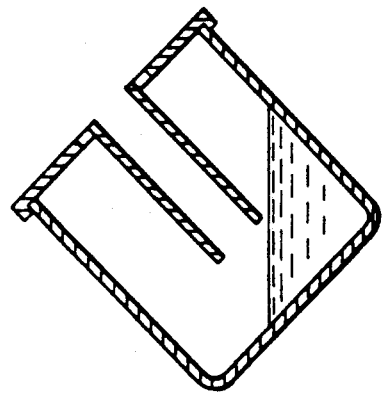
Figure 4:
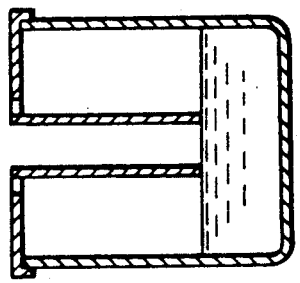

On the other hand, even in the case where the container body 1 is inclined or falls sideways, as shown in FIG. 4, until the time when the deliquescence is stored to the maximum volume, there is no likelihood whatsoever that the deliquescence stored therein will flow out thereof.

Further, any portion of deliquescence which has adhered to the internal wall of the air sending tube 11 upon closure of the bottom end opening of the air sending tube 11 by the deliquescence, in other words, due to the impact or the like caused by the falling of the container body 1, is shielded by the barrel member 21 provided on the barrel 11b, whereby it is ensured that the deliquescence can be received without permitting it to flow out along the inclined surface of the air sending tube 11.

Moreover, the vent passage is formed by the receiving tube 3 which is suspended from the intermediate cover 2, whereby even in the case where the container body 1 is overthrown, it is possible to prevent the deliquescence from flowing out thereof.

The falling of the container body 1 causes the bottom end opening of the air sending tube 11 to be released from the sealed condition, thereby being opened again. However, at the time of falling, the bearing tube 18 for the drive shaft 19 is moved to the position where it is abutted against the projection 16 by the weight of the fan 14, whereby the bearing tube 18 is off the drive shaft 19.

This causes only the drive shaft 19 to rotate and the fan 14 to be inoperative, and as a result, there will be no forced ventilation within the container body. As a consequence, there is little deliquescing action taking place thereafter, so that even if the container body 1 is left in the state of being fallen for a long period of time, there is no case where the stored deliquescence is increased, thereby preventing the deliquescence from flowing out.

By returning the fallen container body 1 to the normal position, the stored deliquescence is located in the storing chamber at the bottom of the container body 1.

The stored deliquescence can be discharged to outside from the opening of the meshed receptacle 5 taken out by removing the cap 7, so that it is possible to load a new moisture absorbent to the meshed receptacle 5 as well as replacing the old batteries with new ones, thereby allowing the dehumidifier to be used again.

While the foregoing description and drawings represent the preferred embodiments of the present invention, it will be obvious to those skilled in the art that various changes and modifications may be made therein without departing from the true spirit and scope of the present invention.

What is claimed is:

1. A dehumidifier for removing moisture contained in air upon discharging said air which has been introduced from outside, comprising: a container body, a deliquescent moisture absorbent disposed within said container body, a fan for introducing said air from outside, a driving source capable of reversely rotating for driving said fan, and a cover for covering a part of the top end of said container body, said top end of said container body which is not covered by said cover being provided with a receiving mouth, said receiving mouth being provided with a meshed receptacle for accommodating therein said deliquescent moisture absorbent, said meshed receptacle being mounted in suspension within said container body; said container body having a receiving tube provided integrally therewith, said receiving tube being suspended from a part of the top end of the container body, whereas said cover is provided with an air sending tube which is located within said receiving tube of said container body and forming an arrangement therewith and is suspended further than said receiving mouth, said receiving tube and said air sending tube forming a vent passage therebetween; said meshed receptacle and arrangement of receiving tube and air sending tube being adjacent to each other.

2. A dehumidifier according to claim 1, wherein said fan and said driving source are located above said air sending tube of said cover.

3. A dehumidifier according to claim 1, including means for causing said fan to engage with a driving shaft of said driving source by its own weight.

4. A dehumidifier according to claim 1, wherein a part of the top end of said container body forms the bottom of a battery chamber, said part also forming said battery chamber together with said cover when covered with said cover.

5. A dehumidifier according to claim 1, wherein a part of the top end of said container body forms the bottom of a battery chamber and further forms said battery chamber together with said cover when covered with said cover.

6. A dehumidifier according to claim 5, wherein a barrel member is provided within said receiving tube provided on said cover, said barrel member being capable of accommodating therein said fan and driving source for said fan and being mounted to the sidewall of said receiving tube only at a top end thereof.

7. A dehumidifier for removing moisture contained in air upon discharging said air which has been introduced from outside, comprising: a container body having a receiving mouth on the top end thereof and a receiving tube which is suspended therein and being provided with the bottom of a battery chamber; a meshed receptacle for accommodating a deliquescent moisture absorbent disposed in suspension within said container body through said receiving mouth; and a cover for covering a part of the top end of said container body excluding said receiving mouth, said cover being located within said receiving tube, forming a vent passage together with said receiving tube, and further forming a battery chamber together with an air sending tube which is suspended lower than said receiving tube and with said bottom of said battery chamber formed on said top end of said container body, wherein on a top end of said air sending tube there are provided a fan and a driving source for said fan, and the air flows either from said receiving tube to said vent passage or vice versa through the interior of said container body according to the rotating direction of said driving source.

* * * * *